United States Patent
Chavali et al.

(10) Patent No.: US 12,499,959 B2
(45) Date of Patent: Dec. 16, 2025

(54) TESTING PARITY AND ECC LOGIC USING MBIST

(71) Applicant: Advanced Micro Devices, Inc., Santa Clara, CA (US)

(72) Inventors: Balatripura S. Chavali, Austin, TX (US); Chetana Nagendra Keltcher, Boxborough, MA (US); William Andrew Halliday, Paige, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/090,733

(22) Filed: Dec. 29, 2022

(65) Prior Publication Data

US 2024/0221854 A1   Jul. 4, 2024

(51) Int. Cl.
*G11C 29/12* (2006.01)
*G06F 11/10* (2006.01)

(52) U.S. Cl.
CPC .......... *G11C 29/12* (2013.01); *G06F 11/1044* (2013.01); *G11C 2029/1208* (2013.01)

(58) Field of Classification Search
CPC ...... G06F 11/10; G06F 11/2215; G06F 11/00; G06F 11/08; G06F 11/27; G06F 11/167; G06F 11/102; G11C 29/42; G11C 29/12; G11C 2029/1208; G11C 29/52; H03M 13/11

USPC .......................................................... 714/718
See application file for complete search history.

(56) References Cited

U.S. PATENT DOCUMENTS

| | | | | |
|---|---|---|---|---|
| 9,984,766 | B1* | 5/2018 | Becker | G06F 12/1433 |
| 11,069,421 | B1* | 7/2021 | Refaeli | G11C 29/4401 |
| 2009/0251988 | A1* | 10/2009 | Kim | G11C 7/1018 |
| | | | | 365/233.18 |
| 2010/0064181 | A1* | 3/2010 | Moyer | G06F 12/126 |
| | | | | 714/48 |
| 2017/0222664 | A1* | 8/2017 | Tsuboi | H03M 13/29 |
| 2017/0345510 | A1* | 11/2017 | Achtenberg | G11C 16/3413 |
| 2020/0135292 | A1* | 4/2020 | Kim | G11C 29/783 |
| 2020/0341869 | A1* | 10/2020 | Langadi | G06F 11/1044 |
| 2021/0049068 | A1* | 2/2021 | Schaefer | G06F 11/1076 |
| 2022/0293207 | A1* | 9/2022 | Benedict | G11C 29/4401 |
| 2023/0015086 | A1* | 1/2023 | Ayyapureddi | G11C 29/42 |

* cited by examiner

*Primary Examiner* — James C Kerveros
(74) *Attorney, Agent, or Firm* — Volpe Koenig

(57) ABSTRACT

A processing device used for MBIST is provided which comprises a data storage structure configured to store data, data protection circuitry configured to add at least one protection bit to corresponding portions of the data written to the data storage structure, data protection checking circuitry configured to identify one or more errors made by the data protection circuitry and an MBIST controller configured to receive the corresponding portions of data written to the data storage structure and receive at least one indication identifying the one or more errors.

19 Claims, 7 Drawing Sheets

200

|  |  |  |  |
|---|---|---|---|
| $MC_{1,1}$ | $MC_{1,2}$ | $MC_{1,3}$ | $MC_{1,4}$ |
| $MC_{2,1}$ | $MC_{2,2}$ | $MC_{2,3}$ | $MC_{2,4}$ |
| $MC_{3,1}$ | $MC_{3,2}$ | $MC_{3,3}$ | $MC_{3,4}$ |
| $MC_{4,1}$ | $MC_{4,2}$ | $MC_{4,3}$ | $MC_{4,4}$ |
| $MC_{5,1}$ | $MC_{5,2}$ | $MC_{5,3}$ | $MC_{5,4}$ |
| $MC_{6,1}$ | $MC_{6,2}$ | $MC_{6,3}$ | $MC_{6,4}$ |
| $MC_{7,1}$ | $MC_{7,2}$ | $MC_{7,3}$ | $MC_{7,4}$ |
| $MC_{8,1}$ | $MC_{8,2}$ | $MC_{8,3}$ | $MC_{8,4}$ |

700

FIG. 7

TESTING PARITY AND ECC LOGIC USING MBIST

BACKGROUND

Built in self-test (BIST) is a hardware mechanism which allows a device to efficiently test itself and improve its reliability. BIST reduces the cost of self-testing by decreasing test-cycle duration, allowing test patterns to be applied at full memory speeds, and decreasing the reliance on external test equipment. In a microprocessor, BIST is typically run coming out of reset, warm reset, (cold or warm reset), but can also be run periodically. BIST is used in integrated circuits and devices for a wide range of industries (e.g., automobiles, aerospace, medical devices, military equipment) to detect of hard memory faults.

BRIEF DESCRIPTION OF THE DRAWINGS

A more detailed understanding can be had from the following description, given by way of example in conjunction with the accompanying drawings wherein:

FIG. 7 is an illustration of an example array of memory cells.

DETAILED DESCRIPTION

Figure 1:
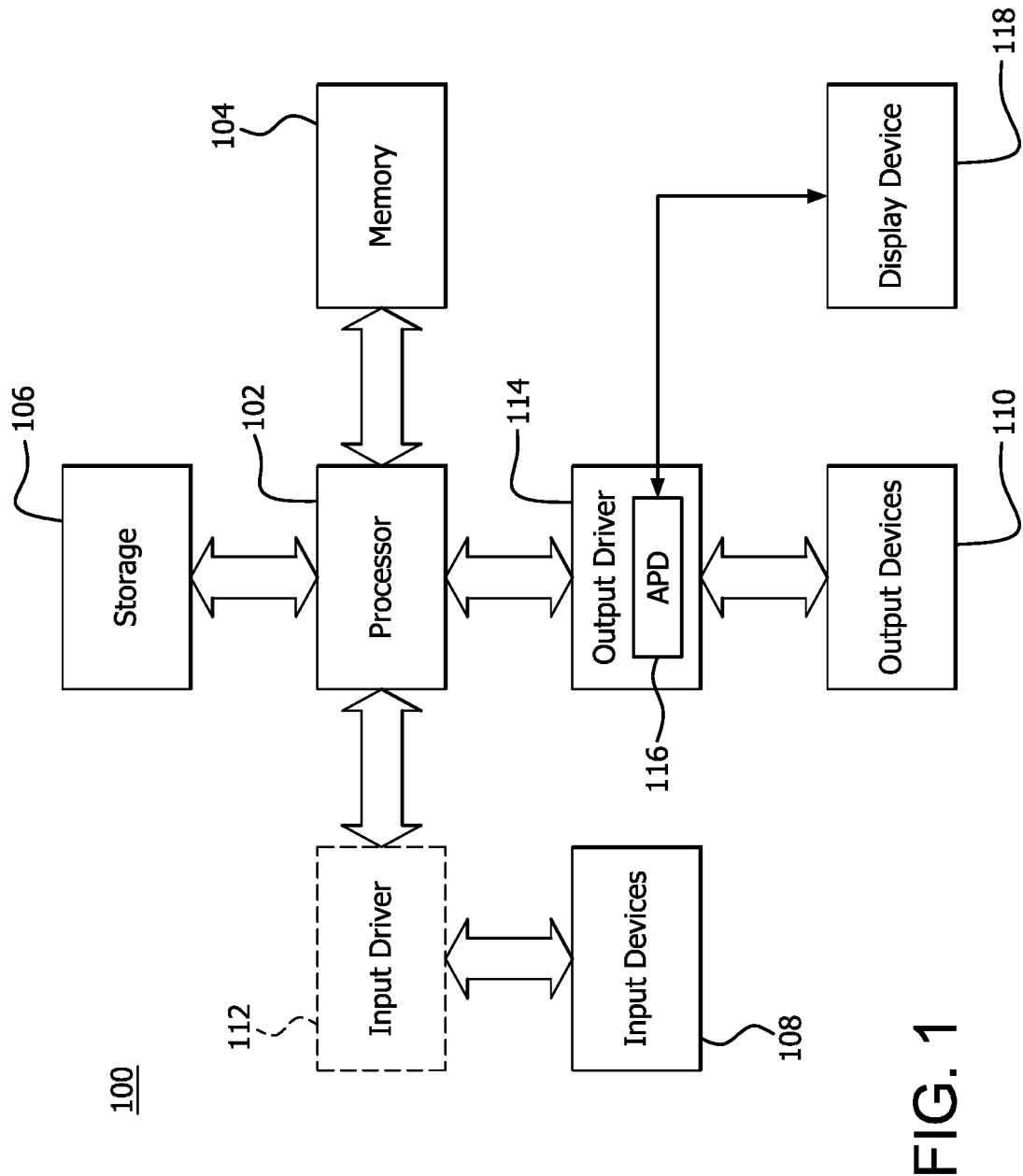
FIG. 1 is a block diagram of an example device in which one or more features of the present disclosure can be implemented.

Parity is a type of data protection used to detect errors (e.g., n-bit data corruption) which occurs in memory by typically adding a parity bit to a string of binary data (e.g., a byte) stored in RAM and computing the parity (odd parity or even parity) to detect whether a data error has occurred. For example, if a device uses even parity and the total number of occurrences of 1s in the data string is an odd number of occurrences, the bit value of the parity bit added to the string of data is set to 1 to make the number occurrences of 1s an even number of occurrences. If the number of occurrences of 1s is an even number of occurrences, the parity bit value is set to 0. When odd parity is implemented, the coding is reversed (i.e., the parity bit value is set to 0 if the number of occurrences of 1s is odd and the parity bit value is set to 1 if the number of occurrences of 1s is even). No error is detected for an even parity implementation when the number of occurrences of bits having a value of 1 (including the parity bit) add up to an even number of occurrences and an error is detected when the number of occurrences of bits having a value of 1 add up to an odd number of occurrences. No error is detected for an odd parity implementation when the number of occurrences of bits having a value of 1 (including the parity bit) add up to an odd number of occurrences and an error is detected when the number of occurrences of bits having a value of 1 add up to an even number of occurrences.

Error correction code (ECC) is another type of data protection and uses ECC to both detect errors and correct errors before the errors cause data corruption or system crashes. Accordingly, ECC memory is used in many applications which have a low error (data corruption) tolerance. ECC uses multiple parity bits assigned to larger strings of data. Instead of a single parity bit per byte, ECC implements a hamming code which uses a number of additional parity bits to detect and correct errors (e.g., 8 bits of ECC syndrome bits generated for every 64 bits of data or a 7-bit ECC code (e.g., single error correction, double error detection (SEC DED ECC) code)) that is automatically generated for every 32 bits of data. For example, when the 32 bits of data is read out, a second 7-bit code is generated and compared to the original 7-bit code. If the codes match, then no error is detected. But if the codes do not match, depending on a number of check bits or syndrome bits, the device can determine where the error occurred in the data and correct the error (e.g., detect two bit errors and correct a single bit error) by comparing the two 7-bit codes.

Memory built in self-test (MBIST) circuitry is used to test data storage structures (e.g., memory) of a device. An MBIST controller generates, during an MBIST procedure, a sequence of read and write operations (e.g., sequence of read and write test patterns) to different memory cells to test if the cells are operating correctly (e.g., detect faults, such as faults where the logic value of a cell is stuck-at 1 or 0, transition delay faults, coupling or pattern sensitive faults and other memory faults). The data protection circuitry (e.g., parity bits generator and ECC bits generator) in conventional devices tests bits and gates around the memory or latch instances. However, the data protection circuitry of these conventional devices are not part of the MBIST hardware logic. Therefore, errors (e.g., logic faults) of the data protection circuitry can propagate or provide incorrect data if they are not tested for faults.

These conventional devices also do not include hardware to drive patterns of data to test if the data protection circuitry is working correctly. In addition, internal memory arrays are not memory mapped which limits the ability to drive the data patterns. Implementing data patterns via software to test the data protection circuitry are very inefficient because of the time required to execute each test pattern via software.

Features of the present disclosure provide improved methods and devices for data protection testing which integrate the data protection circuitry (e.g., parity generator circuitry) and ECC generator circuitry as part of the MBIST hardware circuitry. Features of the present disclosure expand the scope of MBIST circuitry to provide indications of errors by the data protection circuitry (e.g., errors resulting from adding parity bits or errors resulting from adding ECC bits) for each portion of data written to and read from the data storage structures during testing.

Accordingly, because errors (e.g., logic faults) of the tested data protection circuitry (e.g., checked data protection circuitry) are identified and provided to the MBIST controller (i.e., and not just errors of the tested memory as implemented in conventional devices), the errors of the data protection circuitry and any resulting incorrect data are prevented from propagating during testing.

A processing device used for MBIST is provided which comprises a data storage structure configured to store data, data protection circuitry configured to add at least one protection bit to corresponding portions of the data written to the data storage structure, data protection checking circuitry configured to identify one or more errors made by the data protection circuitry and an MBIST controller configured to receive the corresponding portions of data written to and read from the data storage structure and receive at least one indication identifying the one or more errors.

An MBIST controller used in a processing device, the MBIST controller configured to generate a sequence of read and write operations to different portions of a data storage structure and for each corresponding portion of data written to and read from the data storage structure, control data protection generating circuitry to add a number of protection bits to the corresponding portion of data, receive the number of protection bits and the corresponding portion of data written to and read from the data storage structure and receive at least one indication, from data protection checking circuitry, identifying one or more errors by the data protection generating circuitry for the corresponding portion of data.

A method of data protection testing using an MBIST controller is provided which comprises generating portions of data to be written to a data storage structure and for each portion of data, adding protection bits to the portion of data, writing the portion of data and the protection bits to the data storage structure, identifying one or more errors resulting from adding the protection bits based on the portion of data and the protection bits read from the data storage structure and receiving, by the MBIST controller, at least one indication of the one or more errors.

As described herein, testing data protection circuitry refers to the testing of any circuitry used to detect errors and/or correct errors in data storage structures such as memory, latch arrays and register files. Examples of data protection circuitry include, but are not limited to, a parity generator, a parity checker, an ECC generator and an ECC checker.

As used herein, programs includes any sequence of instructions to be executed using one or more processors to perform procedures or routines (e.g., operations, computations, functions, processes, jobs). As used herein, execution of programmed instructions (e.g., applications, drivers, operating systems or other software) on a processor includes any of a plurality of stages, such as but not limited to fetching, decoding, scheduling for execution, beginning execution and execution of a particular portion (e.g., rendering of video on full screen) of the programmed instructions. Programmed instructions include parameter settings (e.g., hardware parameter settings) and parameters (e.g., hardware parameters) having tunable (i.e., changeable) values used to control operation of hardware.

FIG. 1 is a block diagram of an exemplary device 100 in which one or more features of the present disclosure can be implemented. The device 100 includes, for example, a computer, a gaming device, a handheld device, a set-top box, a television, a mobile phone, or a tablet computer. The device 100 can also be implemented as part of an embedded system (e.g., as part of an electronic control unit (ECU) that controls one or more of systems or subsystems in a motor vehicle).

As shown in FIG. 1, exemplary device 100 includes a processor 102, memory 104, a storage 106, one or more input devices 108, one or more output devices 110, an input driver 112 and an output driver 114. It is understood that the device 100 can include additional components not shown in FIG. 1.

Exemplary processor types for processor 102 include a CPU, a GPU, a CPU and GPU located on the same die, or one or more processor cores, wherein each processor core is a CPU or a GPU. Memory 104 is, for example, located on the same die as the processor 102 or located separately from the processor 102. Exemplary memory types for memory 104 include volatile memory, (e.g., random access memory (RAM), dynamic RAM, or a cache) and non-volatile memory (e.g., a hard-disk, motherboard boot read only memory (ROM), and BIOS memory).

Exemplary storage types for storage 106 include a fixed or removable storage, for example, a hard disk drive, a solid state drive, an optical disk, or a flash drive. Exemplary input device types for input device 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Exemplary output device types for output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 is an optional component (indicated by dashed lines) and that the device 100 will operate in the same manner if the input driver 112 is not present.

The output driver 114 includes an accelerated processing device (APD) 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data (SIMD) paradigm. Although various functionality is described herein as being performed by or in conjunction with the APD 116, the functionality described as being performed by the APD 116 is also performed by other computing devices having similar capabilities that are not driven by a host processor (e.g., processor 102) and configured to provide graphical output to a display device 118. The functionality described herein is, for example, performed by any processing system that performs processing tasks in accordance with a SIMD paradigm. Alternatively, the functionality described herein is performed by computing systems that do not perform processing tasks in accordance with a SIMD paradigm.

Figure 2:
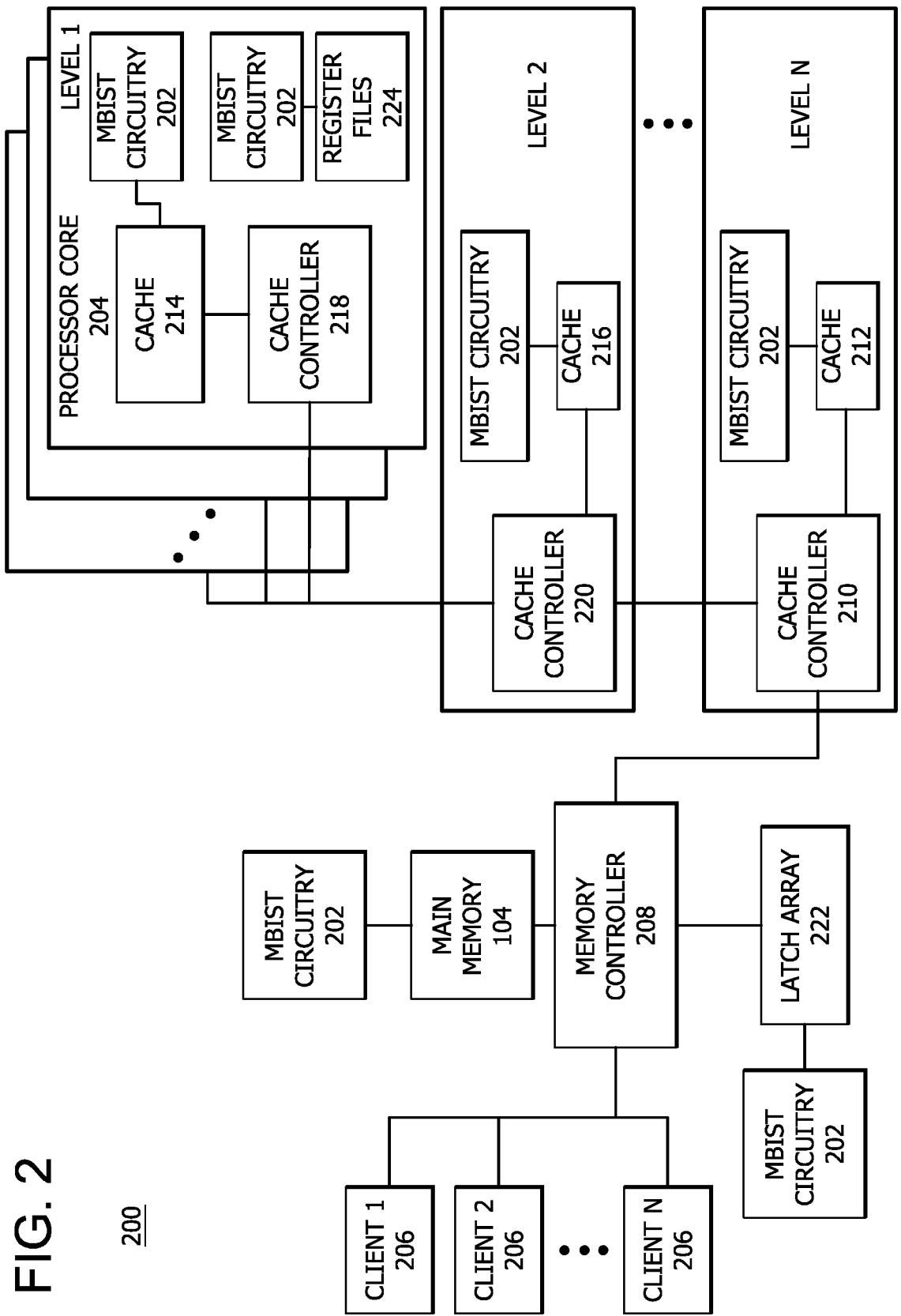
FIG. 2 is a block diagram illustrating example components, including memory BIST (MBIST) circuitry, of a device in which one or more features of the disclosure can be implemented.

FIG. 2 is a block diagram illustrating example components of a device 200 in which one or more features of the disclosure can be implemented. Components shown in FIG. 2 are, for example, components of a processor, such as a CPU, an accelerated processor (e.g., a GPU), a field programmable gate array (FPGA) processor or another processor.

As shown in FIG. 2, the components include MBIST circuitry 202, processor cores 204, clients 206, memory controller 208, cache controllers 210, 218 and 220, and caches 212, 214 and 216.

As shown in FIG. 2, components include a plurality of processor cores 204. Each processor core 204 includes a corresponding level 1 cache controller 218 in communication with a corresponding level 1 cache 214 and configured to process data using the corresponding level 1 cache 214.

As further shown in FIG. 2, components also include a level 2 cache controller 220 in communication with level 2 cache 216 and configured to process data using level 2 cache 216. Cache controller 220 is also in communication with a next cache level (higher cache level). Any number of N level caches can be used. The next level cache, such as N level cache 212 (e.g., last level cache) and N level cache controller 210 can be in communication with and shared by caches of multiple processors, such as for example, caches of a CPU or GPU (not shown), which may be located on the same die, or multiple dies.

Memory controller 208 is in communication with memory 104 (e.g., DRAM) and cache controllers 220 and 218. As shown in FIG. 2, multiple clients 206 are in communication with memory controller 208. Clients 206 include, for example, peripheral memories for which the MBIST circuitry can be implemented. For simplified explanation purposes, FIG. 2 shows three clients 206. However, features of the present disclosure can be implemented for testing the ECC and parity of peripheral memories for any number of clients.

The MBIST circuitry 202 is used to perform data protection testing for a device. The data protection testing includes testing the data storage structures (e.g., memory, latches, registers) for errors. The MBIST circuitry 202 generates sequences of read and write operations (e.g., sequences of test patterns) to different portions (e.g., array of cells) of one or more data storage structures (e.g., memory) to test whether the different portions of the data storage structures are operating correctly.

The data protection testing also includes testing data protection circuitry (e.g., parity generator logic, parity checker logic or ECC generator logic and ECC checker logic) which are used to detect errors and/or correct errors of the data written to and read from the data storage structures (e.g., memory such as memory 104, cache memory 212, 214 and 216, latch arrays such as latch array 222, memory of peripheral clients 206 and register files (not shown)). In addition, the MBIST circuitry 202 generates additional sequences of read and write operations based on feedback information from the data protection checking circuitry (e.g., parity checker logic or ECC checker logic), identifying one or more errors by the data protection checking circuitry (e.g., parity generator logic or ECC checker logic) which are identified by the data protection checking circuitry. Accordingly, because errors (e.g., logic faults) by the data protection circuitry are identified, measures can be taken (e.g., further testing of the data protection circuitry, replacing or fixing the data protection circuitry) to limit or prevent further data protection testing of the device.

A separate MBIST circuitry 202 can also be in communication with and register files (not shown in FIG. 2. As shown in FIG. 2, separate MBIST circuitries 202 are in communication with a different data storage structure (e.g., memory 104, cache memory 212, 214 and 216, and register files 224) of device 200 to detect and/or correct errors for each corresponding data storage structure of device 200. Although not shown in FIG. 2, a device can include a single MBIST circuitry in communication with each data storage structure of the device. Additionally, a device can include multiple MBIST circuitries 202 (not shown in FIG. 2) each in communication with one or more (but not each) data storage structures of a device to detect and/or correct errors for the one or more data storage structures.

As described above, the data protection circuitry of the MBIST circuitry 202 can include logic for detecting errors (e.g., parity logic) of the data structures as well as logic for detecting and correcting errors (e.g., ECC logic).

Figure 3:
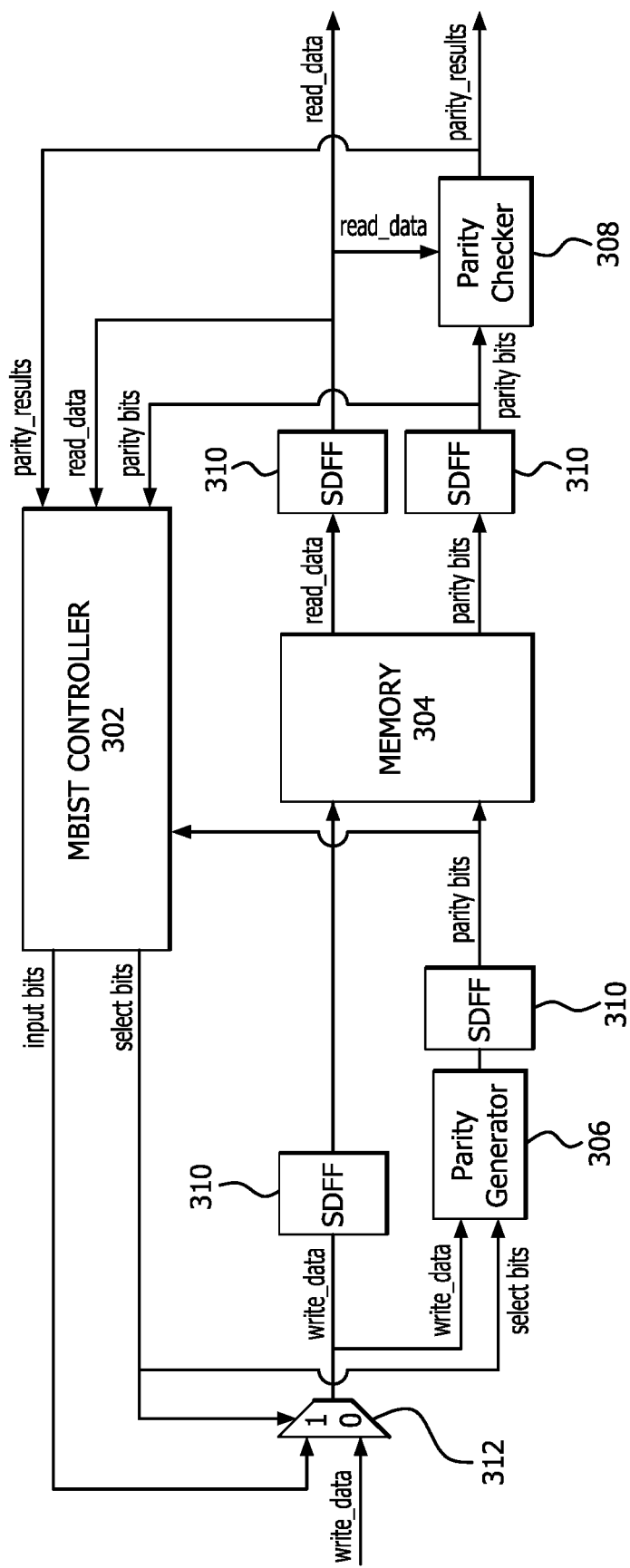
FIG. 3 is a block diagram illustrating an example of the MBIST circuitry shown in FIG. 2 including MBIST parity circuitry.

FIG. 3 is a block diagram illustrating an example of the MBIST circuitry 202 shown in FIG. 2 including MBIST parity circuitry used to detect errors. As shown in FIG. 3, the MBIST circuitry 202 includes MBIST controller 302, parity generator 306, parity checker 308, semi-dynamic flip flops 310 (hereinafter "flip-flops") and multiplexor (MUX) 312. Each component of the MBIST circuitry 202 is connected to (i.e., directly or indirectly through one or more other components) memory 304, as shown in FIG. 3. The MBIST parity circuitry (i.e., parity generator 306 and parity checker 308) shown in FIG. 3 and the parity bits described with regard to FIG. 3 is merely an example of MBIST protection circuitry and protection bits used to detect errors during an MBIST procedure.

The example shown in FIG. 3 includes memory 304 as an example of a data storage structure. As described above, however, features of the present disclosure can be implemented by testing data protection circuitry used to detect errors and/or correct errors in any type of data storage structure, such as memory, cache memory, latch arrays and register files. Memory 304 represents an array of memory cells to be tested. The array of memory cells can be part of any portion of memory of a device, such as for example, main memory, cache memory, memory of a CPU, memory of a GPU, and memory of peripheral devices. For example, FIG. 7 illustrates an example of a two-dimensional array of memory cells having 8 rows of memory cells MCs by 4 columns of memory cells MCs. The number memory cells MCs, as well as the number of rows and columns shown in FIG. 7 is merely an example.

Figure 4:
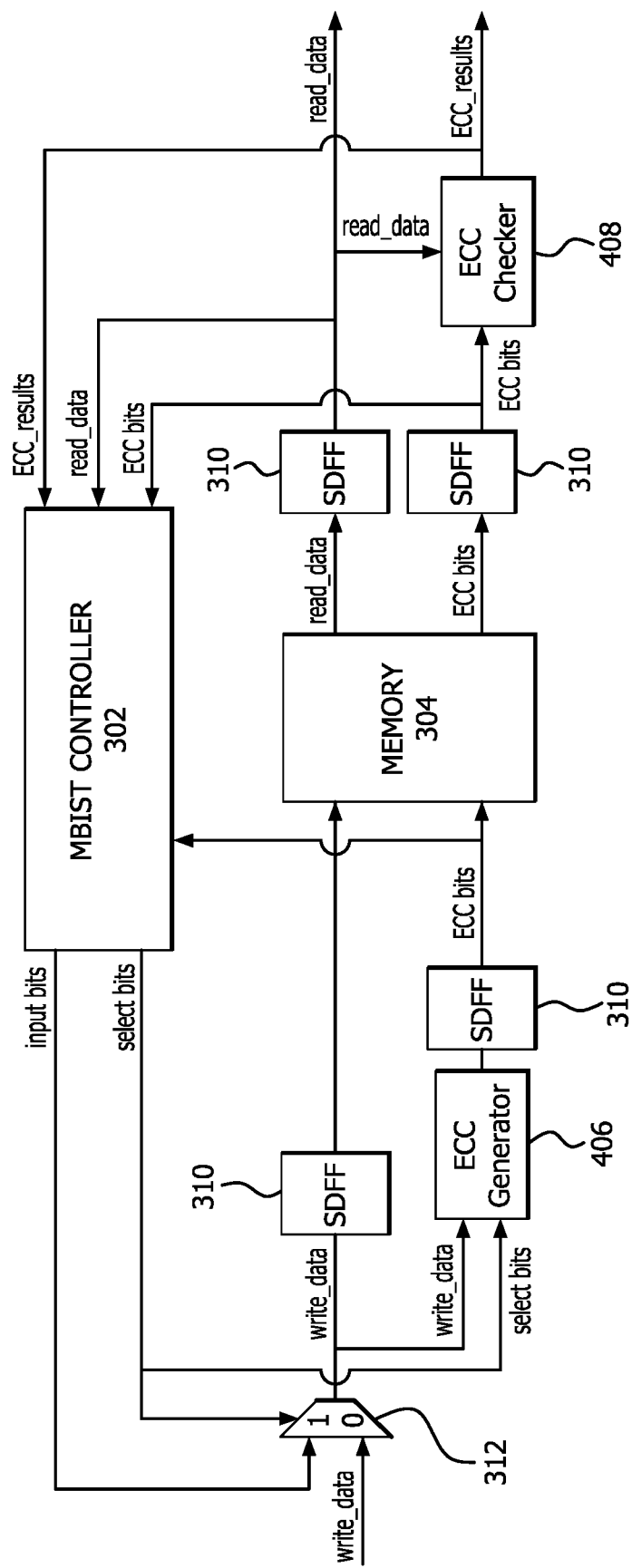
FIG. 4 is a block diagram illustrating an example of the MBIST circuitry shown in FIG. 2 including MBIST error correction code circuitry.

The flip-flops shown in FIG. 3 and FIG. 4 are merely examples of sequential logic elements used to synchronize the logic and bits in the MBIST circuitry 202. The locations of the flip-flops shown in FIG. 3 and FIG. 4 are also examples of locations. Features of the disclosure can be implemented with any number of sequential logic elements and at different locations than those shown in FIG. 3 and FIG. 4.

MBIST controller 302 is configured to generate sequences of reads and writes to one or more portions of memory 304 to test if the memory (e.g., cells of the memory) are operating correctly. For example, as shown in FIG. 3, each bit of data (representing portions of data) is input (as write_data) to multiplexor 312 at a first input (bottom input of the multiplexor 312). The bits of data are received from a processor (e.g., one of the processor cores 204 shown in FIG. 2). MBIST controller 302 also provides input bits of data to a second input (top input of the multiplexor 312). MBIST controller 302 controls the values of bits of data output from the multiplexor to be written to the memory 304 (i.e., write_data) to be the bits of data received from the processor or the input bits using select bits provided to a select input of the multiplexor 312, MBIST controller 302 also controls the parity bits (i.e., protection bits) generated by parity generator 306 (as parity bits) and added to each corresponding portion of data (i.e., write_data provided to a first input of the parity generator 306) that are written to and read from the memory 304. MBIST controller 302 controls the parity bits (e.g., values of the parity bits) which are added to a corresponding portion of data using the select bits which are also provided to a second input of the parity generator 306.

Parity generator 306 then adds the parity bits based on the select bits provided from the MBIST controller 302 and the write_data provided from multiplexor 312. That is, parity bits are added to each corresponding portion of data, which are written to different arrays of memory cells of memory 304 in particular patterns (e.g., different arrays of memory cells MCs shown in FIG. 7). The parity generator 306 also includes, for example, row and address decoders used to select cell locations to be accessed and tested in memory 304 (e.g., locations of memory cells MCs at rows 1-8 and columns 1-4).

Parity checker 308 receives, as inputs, the parity bits and corresponding data read from memory 304 (e.g., read_data), generates additional parity bits from the corresponding data read from memory 304, and compares the additional parity bits to the parity bits read from memory. Based on the comparison, parity checker 308 identifies whether an error occurred by the parity generator 306 (i.e., a parity error resulted from the parity bits added to a corresponding portion of data). Parity checker 308 then provides an indication (e.g., "1" or "0") as parity_results to MBIST controller 302 identifying whether or not an error occurred by the parity generator 306.

Each error by the parity generator 306 is logged (e.g., stored in local memory) by MBIST controller 302. In one example, the errors (e.g., logged errors) by the parity generator 306 are tracked and detection of the tracked errors occurs at the completion of MBIST procedure, indicating either that the number of test patterns generated a target (e.g., threshold) number of correct results (a pass signature and status) or that the number of test patterns did not generate a target (e.g., threshold) number of correct results (fail signature and status). In another example, the MBIST procedure can be terminated during testing in response to a number of errors exceeding an error threshold.

The data that is read from memory (read_data) and the output of the parity checker 308 (parity_results) are also provided to the processor (e.g., one of the processor cores 204 shown in FIG. 2) which provided the write_data to the multiplexor 312.

FIG. 4 is a block diagram illustrating an example of the MBIST circuitry 202 shown in FIG. 2 including MBIST ECC circuitry used to detect and correct errors. The MBIST ECC circuitry (i.e., ECC generator 406 and ECC checker 408) shown in FIG. 4 and the ECC bits described with regard to FIG. 4 is merely an example of MBIST protection circuitry and protection bits used to both detect and correct errors during MBIST. Features of the present disclosure can be implemented, however, using other types of MBIST protection circuitry and protection bits used to both detect and correct errors.

As shown in FIG. 4, the MBIST circuitry includes ECC generator 406 (instead of the parity generator 306 shown in FIG. 3) and ECC checker 408 (instead of the parity checker 308 shown in FIG. 3). The other components (MBIST controller 302, memory 304, semi-dynamic flip flops 310 and MUX 312) and their functions are the same (or substantially similar) in both FIGS. 3 and 4. Accordingly, any description of these components and/or functionality deemed as being superfluous (as being previously described above) is omitted with regard to FIG. 4.

ECC generator 406 generates ECC bits based on the input from the MBIST controller 302 and the output from multiplexor 312. MBIST controller 302 controls the ECC bits (i.e., protection bits) added to each corresponding portion of data written to the memory 304 and reads the ECC bits and data bits from the memory 304.

ECC checker 408 receives, as inputs, the ECC bits and corresponding data read from memory 304, generates additional ECC bits from the corresponding data read from memory 304, and compares the additional ECC bits to the ECC bits read from memory. Based on the comparison, ECC checker 408 identifies whether an error occurred by the ECC generator 406 (i.e., an ECC error resulted from the ECC bits added to a corresponding portion of data). ECC checker 408 then provides an indication (e.g., "1" or "0") as ECC_results to MBIST controller 302 identifying whether or not an error occurred by the ECC generator 406.

Each error by the ECC generator 406 is logged (e.g., stored in local memory) by MBIST controller 302. In one example, the errors (e.g., logged errors) by the ECC generator 306 are tracked and detection of the tracked errors occurs at the completion of MBIST, indicating either that the number of test patterns generated a target (e.g., threshold) number of correct results (a pass signature and status) or that the number of test patterns did not generate a target (e.g., threshold) number of correct results (fail signature and status). In another example, the MBIST can be terminated during testing in response to a number of errors exceeding an error threshold.

The data that is read from memory (read_data) and the output of the ECC checker 408 (ECC_results) are also provided to the processor (e.g., one of the processor cores 204 shown in FIG. 2) which provided the write_data to the multiplexor 312).

Figure 5:
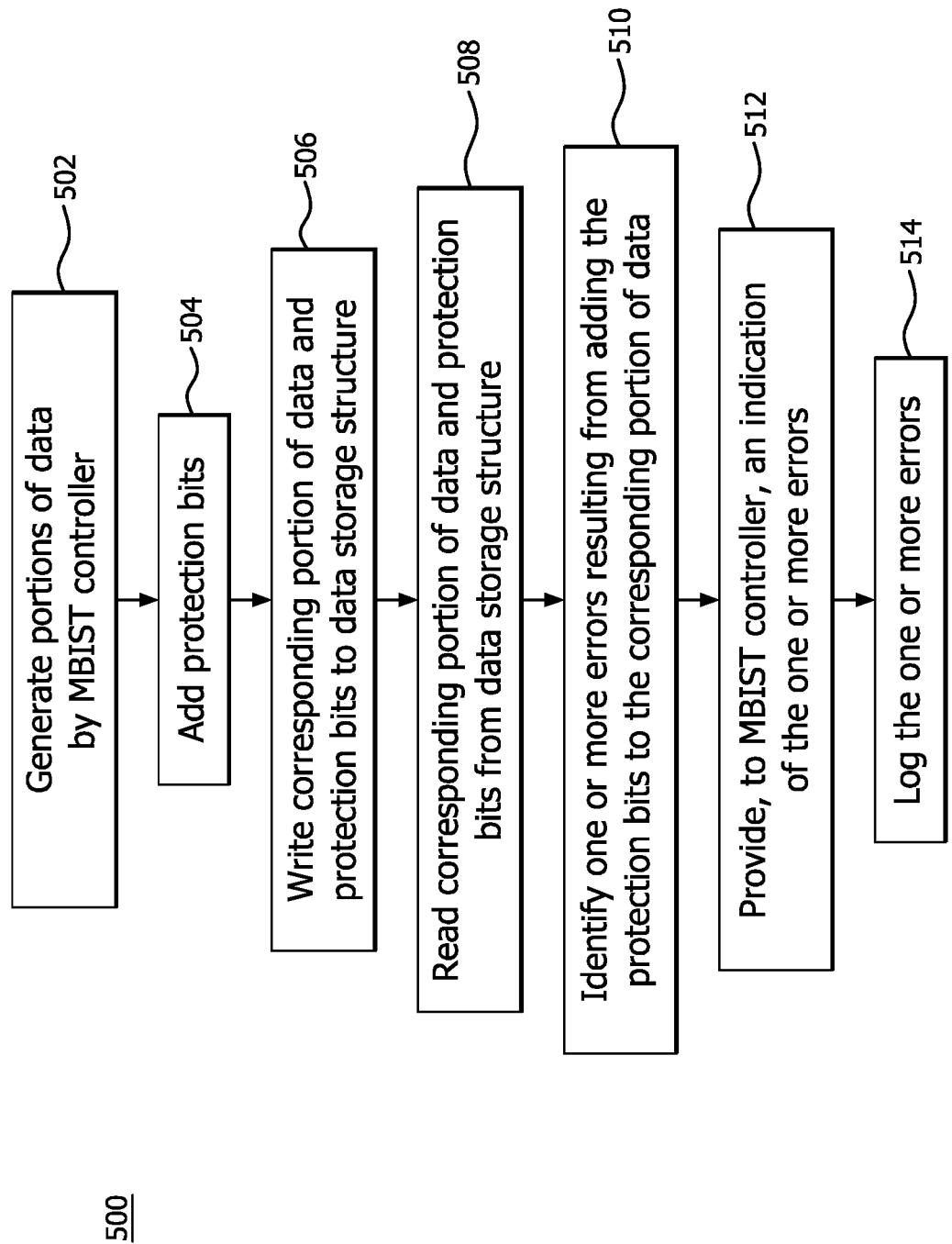
FIG. 5 is a flow diagram illustrating an example method of data protection testing using MBIST according to features of the present disclosure.

FIG. 5 is a flow diagram 500 illustrating an example method of data protection testing using MBIST.

As shown at block 502, the method includes generating portions of data to be written to a data storage structure (e.g., memory). For example, MBIST controller 302 generate sequences of reads and writes to different portions (arrays of cells) to test if the different portions of the data storage structure are operating correctly.

As shown at block 504, for each portion of data, protection bits (e.g., parity bits or ECC bits) are added. For example, MBIST controller 302 controls the number of protection bits added to each corresponding portion of data to be written to the data storage structure.

The portion of data and the protection bits are written to the data storage structure at block 506. The portion of data and the protection bits are then read from the data storage structure at block 508 and provided to both MBIST controller 302 and the data protection checking circuitry (e.g., parity checker 308 or ECC checker 408).

As shown at block 510, one or more errors resulting from adding the protection bits (e.g., parity bits or ECC bits) are identified based on the corresponding portion of data read from the data storage structure (e.g., read_data) and the protection bits that are read from the data storage structure. For example, one or more errors are identified by generating additional protection bits from the portion of data read from the data storage structure, comparing the additional protection bits to the protection bits read from the data storage structure then identifying an error from the comparison (e.g., an error is identified in response to the additional protection bits not matching the protection bits read from memory).

As shown at block 512, the errors resulting from adding the protection bits (e.g., parity bits or ECC bits) are provided to the MBIST controller 302 as parity_results or ECC_results. For example, for each portion of corresponding data written to and read from the data storage structure, one or more identified errors (parity_results or ECC_results) are provided to MBIST controller 302.

As shown at block 514, the method 500 includes logging the errors. For example, MBIST controller 302 logs the errors in local memory. For example, each error (e.g., identified by the parity generator 306 or ECC generator 406) is logged in local memory by MBIST controller 302. The tracked (logged) errors can be used at the completion of MBIST, to indicate a pass or fail signature and status, or alternatively, the MBIST can be terminated during testing in response to a number of tracked (logged) errors exceeding an error threshold. In an example, MBIST controller 302 logs the errors identified during testing of a portion of memory (e.g., a cache levels, a latch array, main memory) and a processor (e.g., 102) globally logs the errors for testing other portions of memory.

Figure 6:
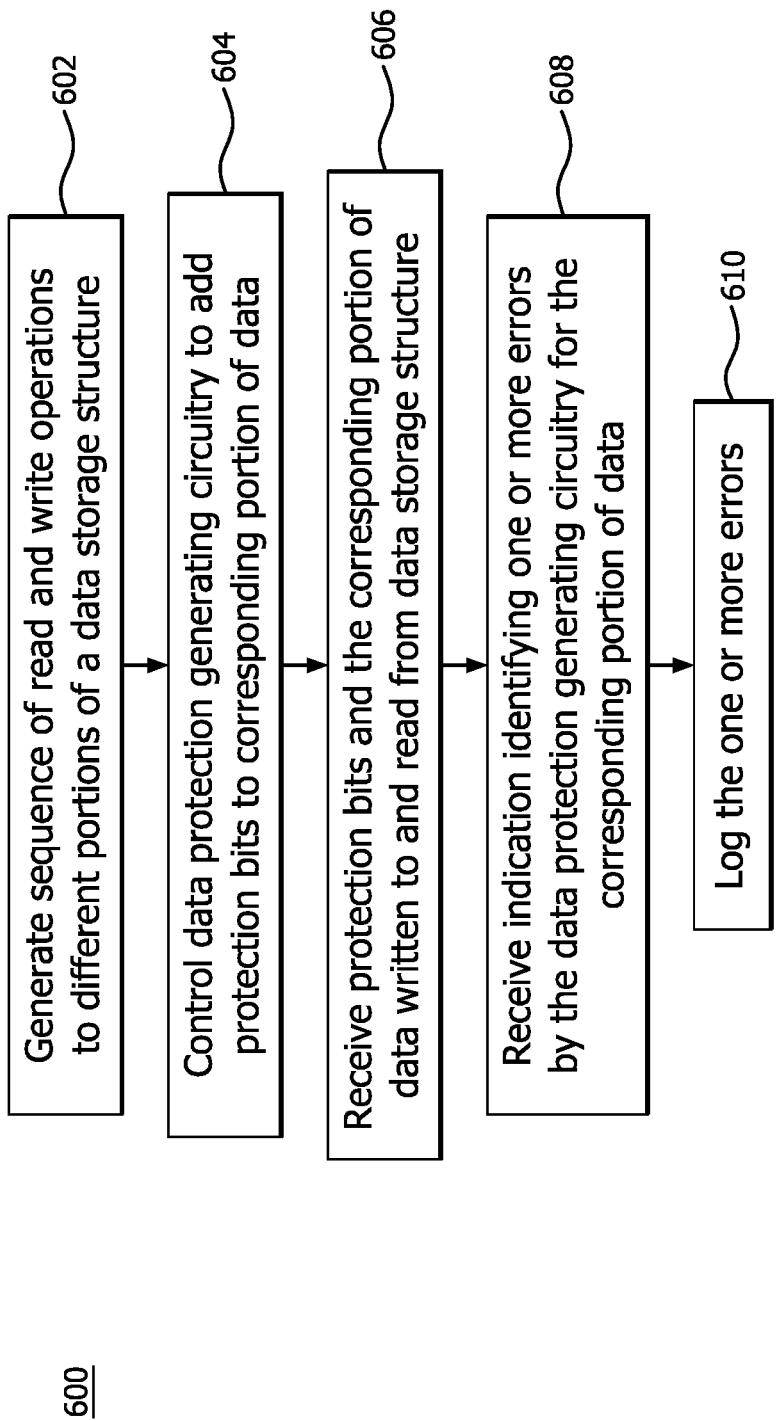
FIG. 6 is a flow diagram illustrating an example method of performing data protection testing by an MBIST controller according to features of the present disclosure.

FIG. 6 is a flow diagram 600 illustrating an example method of performing data protection testing by an MBIST controller.

As shown at block 602, the method 600 includes generating a sequence of read and write operations to different portions of a data storage structure. For example, the MBIST controller 302 generates the sequences of reads and writes by controlling portions of data (e.g., 64 bits of data per portion, 32 bits of data per portion, or another amount of bits per portion) to be written to and read from different portions (arrays of cells) of a data storage structure (e.g., memory) to test if the different portions of the data storage structure are operating correctly (e.g., different portions of the array of memory cells MCs shown in FIG. 7).

As shown at block 604, the method 600 includes controlling data protection generating circuitry to add protection bits to corresponding portion of data. For example, for each portion of data, MBIST controller 302 controls data protection generating circuitry (e.g., parity generator 306 shown in FIG. 3 or ECC generator 406 shown in FIG. 4) to add protection bits (e.g., the parity bits shown in FIG. 3 or the ECC bits shown in FIG. 4).

As shown at block 606, the method 600 includes receiving the protection bits and the corresponding portion of data that are written to and read from the data storage structure. For example, MBIST controller 302 receives the protection bits (e.g., the parity bits shown in FIG. 3 or the ECC bits shown in FIG. 4) to be written to memory 304 and the corresponding portion of data (e.g., write data) to be written to memory 304. MBIST controller 302 also receives the protection bits (e.g., the parity bits shown in FIG. 3 or the ECC bits shown in FIG. 4) read from memory 304 and the corresponding portion of data (e.g., read_data) read from memory 304.

As shown at block 608, the method 600 includes receiving an indication identifying one or more errors by the data protection generating circuitry for the corresponding portion of data. For example, for each corresponding portion of data, data protection checking circuitry (e.g., parity checker 308 shown in FIG. 3 or ECC checker 408 in FIG. 4) identifies one or more errors resulting from adding the protection bits (e.g., parity bits or ECC bits) based on the corresponding portion of data read from the data storage structure (e.g., read_data) and the protection bits that are read from the data storage structure (e.g., the parity bits shown in FIG. 3 or the ECC bits shown in FIG. 4). One or more errors are identified by, for example, generating additional protection bits from the portion of data read from the data storage structure, comparing the additional protection bits to the protection bits read from the data storage structure then identifying an error from the comparison (e.g., an error is identified in response to the additional protection bits not matching the protection bits read from memory 304). The MBIST controller 302 then receives an indication of the one or more errors (e.g., parity_results shown in FIG. 3 or ECC_results shown in FIG. 4) from the data protection checking circuitry (e.g., parity checker 308 shown in FIG. 3 or ECC checker 408 in FIG. 4).

As shown at block 610, the method 600 includes logging the one or more errors. For example, MBIST controller 302 logs error in local memory. For example, each error (e.g., identified by the parity generator 306 or ECC generator 406) is logged in local memory by MBIST controller 302. The tracked (logged) errors can be used at the completion of MBIST, to indicate a pass or fail signature and status, or alternatively, the MBIST can be terminated during testing in response to a number of tracked (logged) errors exceeding an error threshold. In an example, MBIST controller 302 logs the errors identified during testing of a portion of memory (e.g., a cache levels, a latch array, main memory) and a processor (e.g., 102) globally logs the errors for testing other portions of memory.

It should be understood that many variations are possible based on the disclosure herein. Although features and elements are described above in particular combinations, each feature or element can be used alone without the other features and elements or in various combinations with or without other features and elements.

The methods provided include implementation in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements application profiling for power-performance management.

The methods or flow charts provided herein can be implemented in a computer program, software, or firmware incorporated in a non-transitory computer-readable storage medium for execution by a general purpose computer or a processor. Examples of non-transitory computer-readable storage mediums include a ROM, a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device used for performing a memory built in self-test (MBIST), the processing device comprising:
    a data storage structure configured to store data;
    data protection circuitry configured to add a protection token to corresponding portions of the data written to the data storage structure;
    data protection checking circuitry configured to identify one or more errors made by the data protection circuitry; and
    an MBIST controller that is communicatively coupled to the data storage structure, the data protection circuitry and the data protection checking circuitry, wherein the MBIST controller is configured to perform the MBIST by:
  controlling a number of bits in the protection token,
  receiving the corresponding portions of the data written the data storage structure,
  receiving, from the data protection checking circuitry, at least one indication identifying the one or more errors made by the data protection circuitry,
  detecting a logic fault in the data protection checking circuitry based on the at least one indication, and
  indicating that the MBIST fails when the logic fault in the data protection checking circuitry is detected.

2. The processing device of claim 1, wherein the protection token includes at least one parity bit and the data protection circuitry comprises:
  a parity generator configured to add the at least one parity bit to the corresponding portions of the data written to the data storage structure; and
  a parity checker configured to identify the one or more errors by the parity generator based on the at least one parity bit and the corresponding portions of the data written to the data storage structure.

3. The processing device of claim 1, wherein the protection token includes a plurality of error correction code bits and the data protection circuitry comprises:
  an error correction code generator configured to add the plurality of error correction code bits to the corresponding portions of the data written to the data storage structure; and
  an error correction code checker configured to identify the one or more errors by the error correction code generator based on the corresponding portions of the data and the error correction code bits written to the data storage structure.

4. The processing device of claim 1, wherein the protection token includes at least one of:
  at least one parity bit; or
  a plurality of error correction code bits.

5. The processing device of claim 1, wherein for each error identified by the data protection circuitry, the MBIST controller is configured to log an entry in a portion of memory in response to receiving a corresponding at least one indication identifying the one or more errors.

6. The processing device of claim 1, wherein the MBIST controller receives the at least one indication, identifying the one or more errors, from the data protection checking circuitry.

7. The processing device of claim 1, wherein
  the MBIST controller is configured to generate a number of read and write test patterns during an MBIST procedure,
  the one or more errors are tracked for each corresponding portion of the data during the MBIST procedure, and
  at completion of the MBIST procedure, the one or more errors tracked for each corresponding portion of the data indicate whether or not the number of test patterns generated a target number of correct results.

8. The processing device of claim 1, wherein the data storage structure is one of memory, an array of latches and an array of registers.

9. The processing device of claim 1, wherein the protection token includes at least one protection bit and the data protection checking circuitry is configured to:
  for the corresponding portion of the data:
    generate at least one additional protection bit from data read from the data storage structure;
    compare the at least one additional protection bit to the at least one protection bit read from the data storage structure to provide a compared result; and
    identify an error from the compared result.

10. A memory built in self-test (MBIST) controller used in a processing device, the MBIST controller comprising:
  a processor, and
  a communication interface that is communicatively coupled to a data storage structure, a data protection circuitry and a data protection checking circuitry, wherein the MBIST controller configured to:
    generate a sequence of read and write operations to different portions of the data storage structure; and
    for each corresponding portion of data written to and read from the data storage structure:
      control a number of protection bits in a protection token to add to the corresponding portion of data by the data protection circuity;
      control the data protection circuitry to add the protection token to the corresponding portion of data;
      receive the number of protection bits and the corresponding portion of data written to and read from the data storage structure;
      receive at least one indication, from data protection checking circuitry, identifying one or more errors by the data protection circuitry,
      detect a logic fault in the data protection checking circuitry based on the at least one indication,
      indicate that the MBIST fails when the logical fault in the data protection checking circuitry is detected.

11. The MBIST controller of claim 10, wherein the number of the protection bits is a number of parity bits and the MBIST controller is configured to:
  control the data protection circuitry to add the number of parity bits to the corresponding portion of data; and
  receive the indication, from the data protection checking circuitry, identifying the one or more errors resulting from the data protection circuitry adding the number of parity bits.

12. The MBIST controller of claim 10, wherein the number of the protection bits is a number of error correction code bits and the MBIST controller is configured to:
  control the data protection circuitry to add a number of error correction code bits to the corresponding portion of data; and
  receive the indication, from the data protection checking circuitry, identifying one or more errors resulting from the data protection circuitry adding the number of error correction code bits.

13. The MBIST controller of claim 10, wherein for each error identified by the data protection checking circuitry, the MBIST controller is configured to log an entry in a portion of memory.

14. A method for performing a memory built in self-test (MBIST), the method comprising:
  generating, by a MBIST controller, portions of data to be written to a data storage structure;
  controlling, by the MBIST controller, a number of protection bits in a protection token to be added to the corresponding portion of data;
  writing, by the MBIST, the data and the protection token to the data storage structure using data protection circuitry;
  receiving, by the MBIST controller an indication of one or more errors made by the data protection circuitry;
  detecting a logic fault in the data protection checking circuitry based on the indication; and indicating that the MBIST fails when the logical fault in the data protection checking circuitry is detected.

15. The method of claim 14, further comprising logging the one or more errors in memory.

16. The method of claim 14, wherein adding the protection bits to the portion of data comprises adding parity bits to the portion of data.

17. The method of claim 14, further comprising:
generating additional parity bits from data read from the data storage structure;
comparing the additional parity bits to parity bits read from the data storage structure to provide a compared result; and
identifying an error from the compared result.

18. The method of claim 14, wherein adding the protection bits to the portion of data comprises adding error correction code bits to the portion of data.

19. The method of claim 14, further comprising:
generating additional error correction code bits from the data read from the data storage structure;
comparing the additional error correction code bits to error correction code bits read from the data storage structure to provide a compared result; and
identifying an error from the compared result.

* * * * *